(12) United States Patent
Borchert et al.

(10) Patent No.: US 8,147,232 B2
(45) Date of Patent: Apr. 3, 2012

(54) MOLD TOOL FOR THE PRODUCTION OF EXTRUSION BLOW MOLDED PRODUCTS

(75) Inventors: Matthias Borchert, Bonn (DE); Timo Kramer, Hirz-Maulsbach (DE); Dirk Eulitz, Bonn (DE); Gerd Wolter, Konigswinter (DE); Harald Lorenz, Bad Neuenahr-Ahrweiler (DE); Deniz Bienhuls, Windhagen (DE); Christoph Mehren, Konigswinter (DE); Robert Lower, Rheinbach (DE)

(73) Assignee: Kautex Textron GmbH & Co. KG, Bonn (DE)

( * ) Notice: Subject to any disclaimer, the term of this patent is extended or adjusted under 35 U.S.C. 154(b) by 402 days.

(21) Appl. No.: 11/760,613

(22) Filed: Jun. 8, 2007

(65) Prior Publication Data
US 2009/0047375 A1  Feb. 19, 2009

Related U.S. Application Data

(60) Provisional application No. 60/806,491, filed on Jul. 3, 2006.

(30) Foreign Application Priority Data

Jun. 9, 2006  (DE) .......................... 10 2006 027 256

(51) Int. Cl.
*B29C 49/30* (2006.01)
(52) U.S. Cl. ..................... 425/126.1; 425/116; 425/117; 425/121; 425/126.2; 425/522
(58) Field of Classification Search .................. 425/522, 425/525, 535, 538, 541, 532, 534, 503, 126.1, 425/500, 504, 516, 519, 113, 114, 116, 121, 425/123, 126.2, 127, 524
See application file for complete search history.

(56) References Cited

U.S. PATENT DOCUMENTS
3,089,186 A * 5/1963 Park .............................. 425/525
(Continued)

FOREIGN PATENT DOCUMENTS
DE           10010900           9/2001
(Continued)

OTHER PUBLICATIONS

English Translation of International Preliminary Report on Patentability issued in related International Patent Application No. PCT/EP2007/004537 dated Jan. 22, 2009.

(Continued)

*Primary Examiner* — Joseph Del Sole
*Assistant Examiner* — Seyed Masoud Malekadeh
(74) *Attorney, Agent, or Firm* — Grossman Tucker Perreault & Pfleger, PLLC

(57) ABSTRACT

The invention concerns a mold tool for the production of extrusion blow molded products, comprising at least three mold portions (2a, 2b, 3) which define a mold cavity (4) and of which two are in the form of outer molds (2a, 2b) and one is in the form of a central mold (3). The outer molds (2a, 2b) and the central mold (3) are displaceable from and towards each other in the sense of an opening and closing movement of the tool. The central mold (3) is provided with component holders (11) which can be moved out of and into the tool plane defined by the central mold and are arranged in turn on a carrier (10) which is also displaceable with respect to the central mold (3).

7 Claims, 4 Drawing Sheets

U.S. PATENT DOCUMENTS

| | | | | |
|---|---|---|---|---|
| 3,616,491 A * | 11/1971 | Vollers | | 425/525 |
| 3,969,060 A * | 7/1976 | Rosenkranz et al. | | 425/525 |
| 4,396,574 A * | 8/1983 | Kovacs | | 264/533 |
| 4,563,148 A * | 1/1986 | Hasl et al. | | 425/503 |
| 4,571,320 A * | 2/1986 | Walker | | 264/40.1 |
| 4,639,207 A * | 1/1987 | Slat et al. | | 425/503 |
| 4,701,121 A * | 10/1987 | Jakobsen et al. | | 425/526 |
| 4,755,117 A * | 7/1988 | Onnenberg et al. | | 425/4 R |
| 4,815,955 A * | 3/1989 | Krall | | 425/116 |
| 4,824,630 A * | 4/1989 | Mohney | | 264/509 |
| 4,854,848 A * | 8/1989 | Krall et al. | | 425/503 |
| 4,909,723 A * | 3/1990 | Slat et al. | | 425/503 |
| 4,913,642 A * | 4/1990 | Weber | | 425/275 |
| 4,954,070 A * | 9/1990 | Dunlap | | 425/503 |
| 4,983,349 A * | 1/1991 | Krall et al. | | 264/509 |
| 5,169,653 A * | 12/1992 | Tate et al. | | 425/503 |
| 5,308,573 A * | 5/1994 | Hirakawa | | 264/516 |
| 5,681,595 A * | 10/1997 | Travaglini | | 425/436 R |
| 5,736,173 A * | 4/1998 | Wright et al. | | 425/577 |
| 5,792,482 A * | 8/1998 | Yamamoto | | 425/116 |
| 6,095,788 A * | 8/2000 | van Manen et al. | | 425/526 |
| 6,386,849 B1 * | 5/2002 | Kroeger et al. | | 425/112 |
| 6,454,988 B1 * | 9/2002 | Condon | | 264/509 |
| 6,461,141 B1 * | 10/2002 | Harrison et al. | | 425/556 |
| 6,821,100 B2 * | 11/2004 | Kroeger et al. | | 425/112 |
| 6,994,543 B2 * | 2/2006 | Chang | | 425/504 |
| 2001/0015513 A1 * | 8/2001 | Schaftingen et al. | | 264/515 |
| 2002/0105115 A1 * | 8/2002 | Sadr | | 264/510 |
| 2003/0164572 A1 | 9/2003 | Pappert et al. | | |

FOREIGN PATENT DOCUMENTS

| | | |
|---|---|---|
| EP | 1334817 | 8/2003 |
| JP | 61114835 | 6/1986 |
| JP | 2006015744 | 1/2006 |

OTHER PUBLICATIONS

International Search Report dated Oct. 15, 2007 issued in related International Patent Application No. PCT/EP2007/004537.

* cited by examiner

MOLD TOOL FOR THE PRODUCTION OF EXTRUSION BLOW MOLDED PRODUCTS

This application claims priority to German Application DE 10 2006 027 256, filed Jun. 9, 2006 and to U.S. Provisional Application 60/806,491 filed Jul. 3, 2006.

FIELD

The invention concerns a mold tool for the production of extrusion blow molded products.

BACKGROUND

Known mold tools for extrusion blow molding usually comprise two mold halves which are of a mutually complementary configuration and which jointly define a mold cavity. In the extrusion blow molding procedure, a thermoplastic extrudate, generally in the form of a tube, is put into position between the opened halves of the tool. The tool closes around the preform, the latter is applied within the tool against the inside wall of the cavity formed by the tool so that the finished article is of an external configuration corresponding to the internal contour of the mold tool. Shaping of the preform within the cavity of the tool is effected either by expansion of the preform by means of gas pressure or by virtue of the preform being applied against the inside wall of the tool by means of a reduced pressure which is produced by way of passages in the mold wall.

As already mentioned in the opening part of this specification, it is known both to expand extrudates in tube form within a mold tool and also to transform extrudates in the form of bands or webs in the tool. Simple blow molding molds are of a two-part nature, wherein the mold halves are arranged displaceably relative to each other on or in a closing frame structure. Within the closing frame structure the parts of the tool perform an opening and closing movement. Often the closing frame structure itself is also displaceable with respect to one or more stationarily arranged extrusion heads.

Hollow bodies such as bottles, canisters, tanks or the like are usually produced with the extrusion blow molding process. It will be appreciated that it is not possible to produce components involving severely undercut configurations with the blow molding process, at least not without the assistance of sliders in the tool. In addition parts in respect of which precise dimensional accuracy of the wall thickness is an important consideration cannot be produced in the blow molding process as the manner of manufacture means that only the external contour of the hollow body can be exactly reproduced. For that reason screwthreads or other component parts on containers in respect of which dimensional accuracy is an important consideration are often fitted into the mold tool in the form of an injection-molded insert portion, before the preform is introduced into the mold tool. A similar procedure is involved in applying labels to bottles (in-mold labeling).

In regard to many technical components it is desirable for insert portions to be placed within the hollow body. Particularly in the production of fuel tanks, valves, pumps, floats, surge containers and the like such insert portions must be fitted thereinto. They can be fitted into the tank during manufacture or fitted into the tank subsequently through openings.

For many different reasons it is particularly advantageous for insert portions to be already introduced into the hollow body during production thereof, in which case precise placement and fixing of the part in question in the tank to be produced often causes difficulties. It has long been known for insert portions to be also blow molded in position in the production of hollow bodies. That is usual for example in the production of battery casings of plastic material or other electronic units. In that case the electrodes or conductor tracks are placed beneath the extrusion head by means of a gripper in such a way that they are enclosed by the tubular extrudate. Upon subsequent closure of the mold and expansion of the preform, the plastic material of the preform in part flows through the element in question so that it is anchored firmly within the hollow body to be produced.

That is not so simple when a plurality of insert portions are to be placed in the hollow body in a predetermined spatial arrangement relative to each other. Then, fixing those insert portions to the inside wall of the hollow body and also exact positioning usually causes difficulties.

In the production of fuel tanks it would be desirable for example for valves, valve mounting means and fuel conduits connecting same to be fixed in the form of completely pre-assembled conduit manifolds to the inside wall of the tank in production thereof.

Therefore the object of the invention is to provide a novel tool which in the production of extrusion blow molded hollow bodies permits exact placement of a plurality of insert portions even when the hollow body is of a spatially complex configuration.

SUMMARY

That object is attained by a mold tool for the production of extrusion blow molded products, comprising at least three mold portions which define a mold cavity and of which two are in the form of outer molds and one is in the form of a central mold, wherein the outer molds and the central mold can perform an opening and closing movement from and to each other and the central mold is provided with component holders which can be moved out of and into the tool plane defined by the central mold and wherein the displaceable component holders are arranged on a carrier which can be set in and out with respect to the longitudinal central plane of the central mold. The term tool plane in accordance with the invention is used to denote the separation plane between two respective adjacent portions of the tool, wherein such a separation plane is not necessarily a plane in the strictest geometrical sense. The term tool plane or separation plane is in that respect a familiar technical term.

In particular due to the fact that a displaceable carrier is provided within the central mold, the component holders can be brought into an optimum starting position for actuation of the displaceable component holders, even in the case of complex mold cavity contours, in particular when the tool separation plane is in an off-center position.

The use of a displaceable carrier further affords the advantage that the central mold can be of comparatively small dimensions, even when large displacement movements are involved. In that way it is also possible for components to be fitted into comparatively deep mold cavities.

When using telescopic cylinders for producing the inward and outward movements of the component holders, for example in the case of an asymmetrically divided tool the stroke movement which is required at one side in the opening and closing direction of the tool could be so great that the distance is either not to be bridged or the stability of the apparatus suffers as a result. In accordance with the invention that is remedied by the carrier which is displaceable with respect to the central mold.

Desirably the carrier can be set out or extended at each side of the longitudinal central plane of the central mold.

In a variant of the mold tool according to the invention it is provided that the carrier is lockable at least in the set-out or extended position. Such a locking effect is desirably mechanical or positively locking, so that the carrier forms a stable support for further extension movement of the component holders by way for example of pneumatic cylinders or the like.

The carrier can be guided displaceably within the central mold in the opening and closing movement direction of the mold portions.

In a desirable variant of the mold tool according to the invention it is provided that the carrier is displaceable by means of at least one pneumatic drive.

The invention is to be so interpreted that the drives for the component holders and also for the carrier can alternatively also be electrically or hydraulically operated.

In a preferred variant of the mold tool according to the invention the component holders are displaceable with respect to the carrier by way of pneumatic drives fixed on or supported against the carrier.

A plurality of carriers which can be moved out and in stepwise can be arranged within the mold cavity in mutually nested relationship Furthermore it is possible in accordance with the invention for the carriers and component holders to co-operate in such a way that the displacement movements of the carriers on the one hand and the component holders on the other hand are implemented in different directions, that is to say for example perpendicularly to each other, so that exact placement of a plurality of insert portions is possible, even in relation to a rugged and indented internal contour of the hollow body, at an angle relative to the opening and closing movement of the tool.

DESCRIPTION OF THE DRAWINGS

The invention is described hereinafter by means of an embodiment by way of example illustrated in the drawings in which.

DETAILED DESCRIPTION

Figure 1:
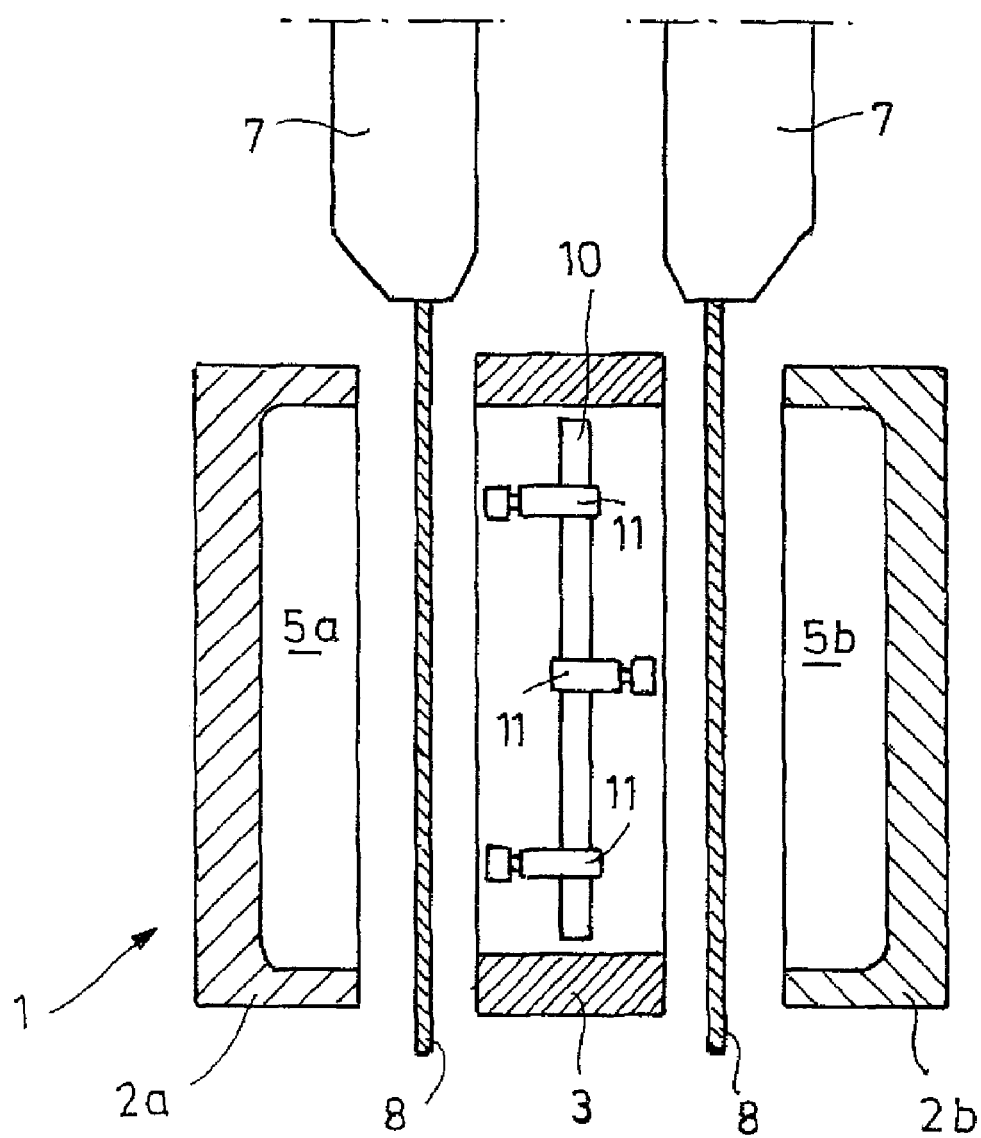
FIG. 1 shows a longitudinal section through the opened mold tool according to the invention, and FIGS. 2-7 each show a cross-section through the mold tool according to the invention, illustrating the various steps in the production of a blow molded product.
Figure 1:
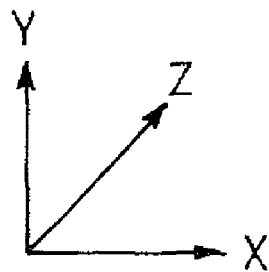

The mold tool 1 shown in FIG. 1 is in the form of a three-part tool comprising two outer molds 2a, 2b and a central mold 3. The invention however is to be interpreted such that a total of more than three mold portions can be provided, for example two central molds and two outer molds, which overall enclose a mold cavity 4. Each of the outer molds 2a, 2b forms a sub-cavity 5a, 5b, the inside wall of which respectively defines or determines the contour of the finished product 6 (See FIG. 7).

Figure 6:
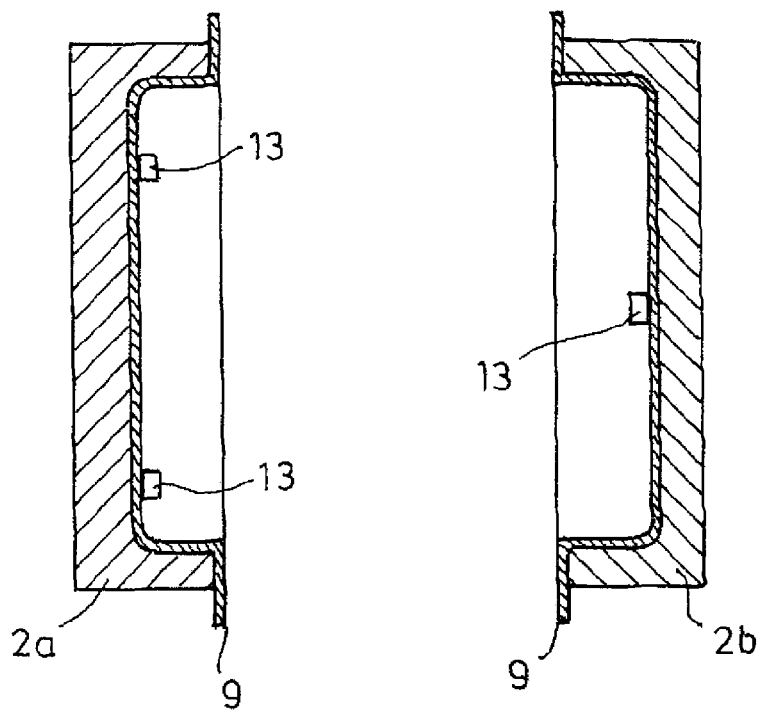

In the embodiment shown in FIG. 1 the tool is arranged in an open condition beneath two extrusion heads 7, from each of which an extrudate 8 in web form and comprising thermoplastic plasticized material issues in a hanging condition. The portions of the tool 1 are arranged on a closing frame structure (not shown), on which the outer molds 2a, 2b are displaceable with respect to the central mold 3 transversely with respect to the extrusion direction (X-direction) in such a way that they open and close with respect to the central mold 3 (See FIG. 2 vs. FIG. 3), the extrudate 8 being respectively received between the central mold 3 and an outer mold 2a, 2b. As is usual in blow molding, the outer molds 2a, 2b close against the central mold 3. As already mentioned in the opening part of this specification, the displacement movement is produced on a closing frame structure by means of hydraulic drives, with the extrudate 8 being severed between the extrusion heads 7 and the tool 1. As can be seen in particular from the views in FIGS. 6 and 7, the extrudate projects laterally beyond the tool 1 so that a peripherally extending flange 9 is formed when the tool 1 is closed.

Arranged within the central mold 3 is a carrier 10 which is displaceable with respect to the central mold and which is displaceable or movable in the opening and closing movement of the tool 1 or the outer molds 2a, 2b, that is to say in the X-direction. The carrier 10 is guided displaceably in that direction and is moved by means of pneumatic drives (not shown). If required it can be displaced out of the longitudinal central plane of the central mold 3 (See FIGS. 4 and 5) both in a direction towards the outer mold 2a shown at the left in FIG. 1 and also in the direction of the outer mold 2b shown at the right.

Figure 2:
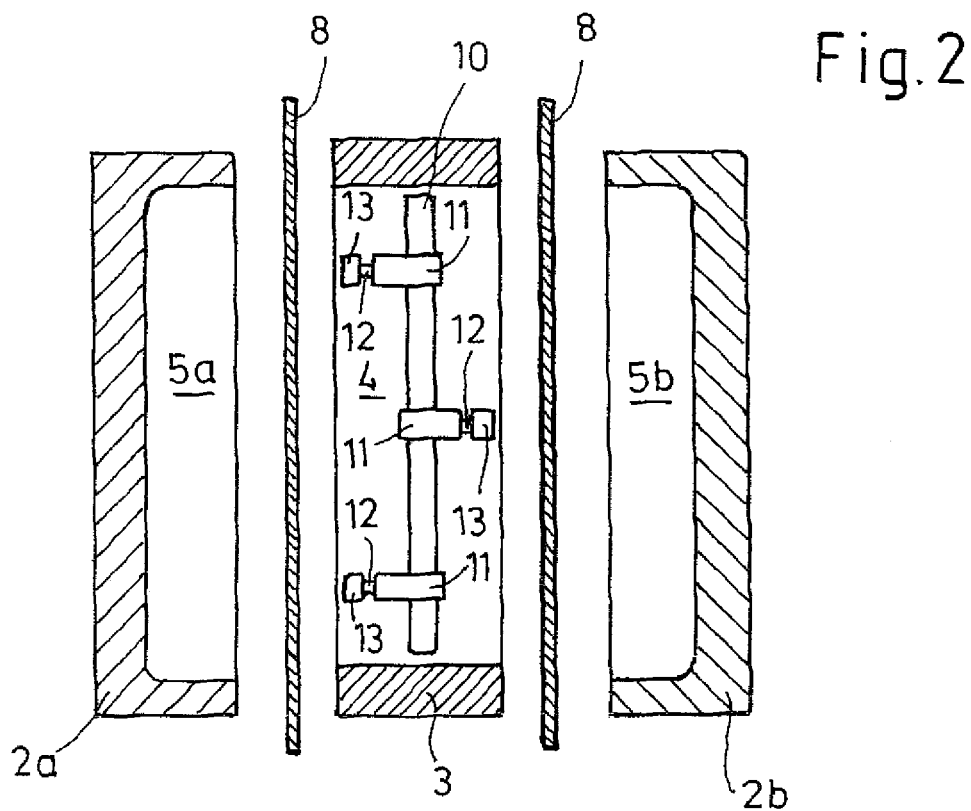
Figure 3:
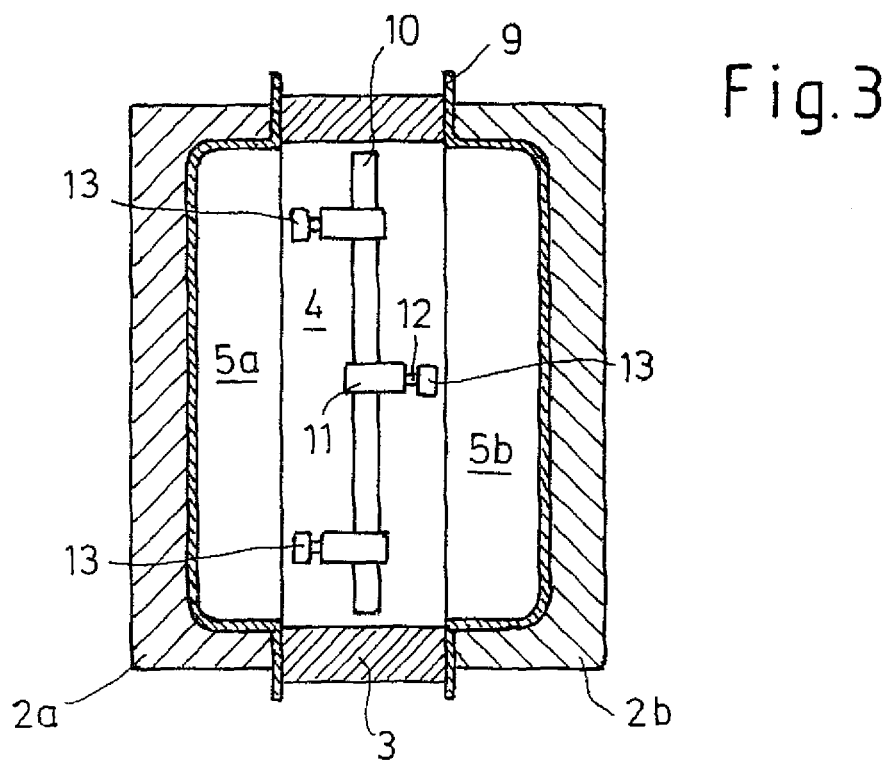

Arranged on the carrier 10 are component holders 11 which in turn are displaceable with respect to the carrier 10 and which are displaceable with respect to the carrier 10 by way of cylinders 12 (See FIG. 2).

Figure 7:
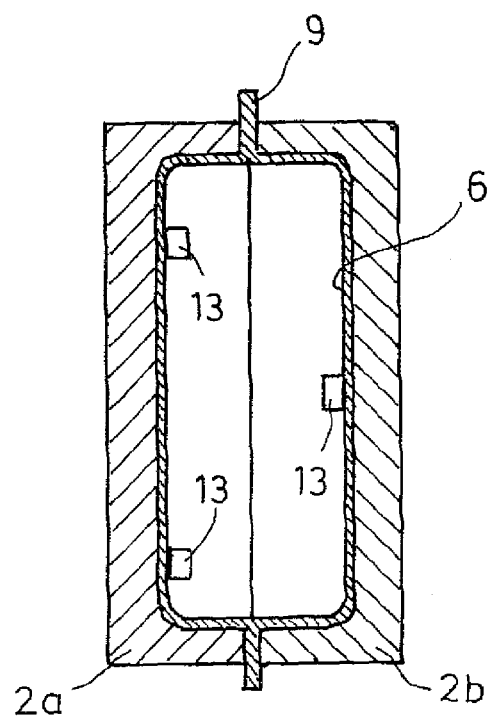

The embodiment illustrated in the Figures is described with reference to the production of a fuel tank as the product 6 with valve mounting means 13 fitted therein (See FIG. 7).

Figure 4:
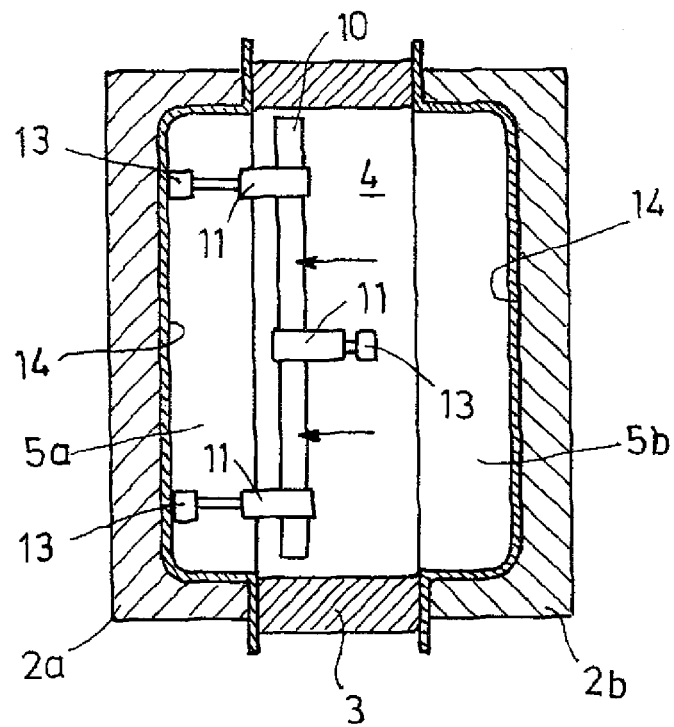

The valve mounting means 13 are welded to the inside wall 14 at various locations during the production of the fuel tank (See FIG. 4).

FIG. 2 firstly shows the starting condition of the tool 1 with the extrudate 8 arranged between the outer molds 2a, 2b and the central mold 3.

The component holders 11 which are in turn arranged on the carrier 10 are in their starting position and are fitted with the above-mentioned valve mounting means 13.

In a next step in the process (See FIG. 3) the outer molds 2a, 2b are closed against the central mold 3. The extrudate 8 is then expanded by means of the action of compressed gas and/or vacuum within the mold cavity 4 so that the extrudate bears against the inside wall of the sub-cavities 5a, 5b.

Figure 5:
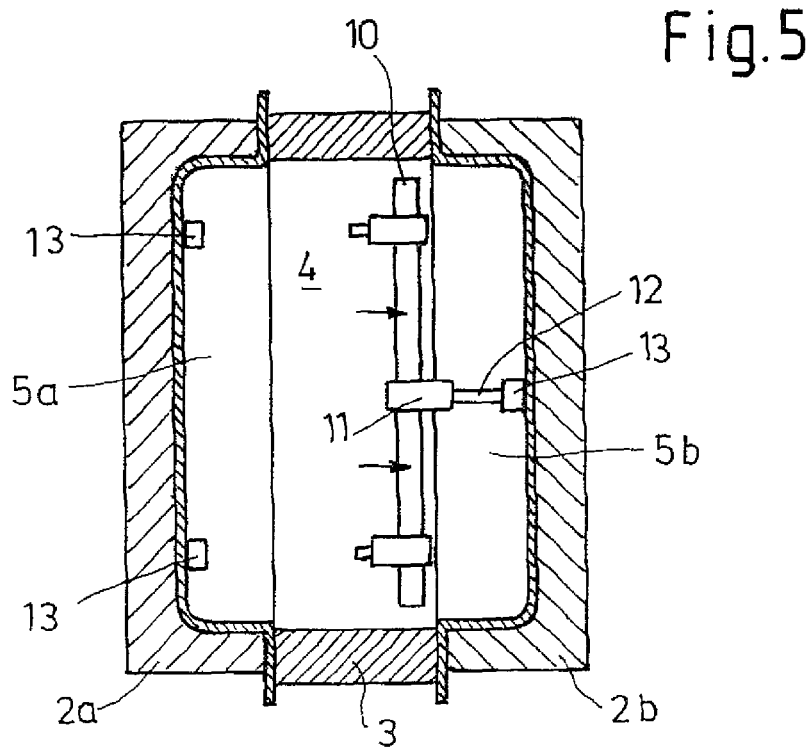

In a further step the carrier 10 is moved out with respect to the central mold 3 in a direction towards the outer mold 2a. The carrier is locked in that position by way of locking elements (not shown). The cylinders 12 with the component holders 11 disposed thereon are then extended so that the valve mounting means 13 are pressed against the inside wall 14 of the product (See FIG. 4). The valve mounting means which also comprise plastic material are welded to the inside wall 14 or fixed to the inside wall 14 in some other fashion. The cylinders 12 are retracted and then the carrier 10 is moved out of the central mold 3 in a direction towards the outer mold 2b. As is shown in FIG. 5, a component holder 11 with a component arranged thereon is extended in the direction towards the inside wall 14 of the product 6 or intermediate product which is in the sub-cavity 5b. The component is placed on and welded to the inside wall 14. In a next step the carrier 10 and the component holders are moved in again and the outer molds 2a, 2b open and the central mold is removed from between the outer molds 2a, 2b, that is to say displaced in the Z-direction in FIG. 1 (See FIG. 6). The outer molds 2a, 2b can then close again (See FIG. 7). The peripherally extending flange 9 of the product 6 forms a peripherally extended welded seam of the finished product which can subsequently be removed from the mold.

In the foregoing example the mold tool according to the invention has been described with only one carrier. As already mentioned in the opening part of this specification a plurality of carriers can be arranged in the central mold, and those carriers are arranged for example in mutually nested relationship.

It is also possible in accordance with the invention for the extension movements of the carriers and the components relative to each other to be produced in a plurality of directions, although this is shown in simplified form in relation to the embodiment by way of example. There the direction of movement of the carrier and the component holders is implemented only in the X-direction.

LIST OF REFERENCES

1 tool
2a, 2b outer molds
3 central mold
4 mold cavity
5a, 5b sub-cavity
6 product
7 extrusion heads
8 extrudate
9 flange
10 carrier
11 component holder
12 cylinder
13 valve mounting means
14 inside wall of the product

The invention claimed is:

1. A mold tool for the production of an extrusion blow molded hollow body, the hollow body including an inside wall, the mold tool separable along vertical parting lines and having an open and closed position, comprising at least three mold portions and of which two are outer molds which define a mold cavity and one is a central mold, said central mold having sides and including a carrier within said central mold when the mold tool is in said open position, wherein the outer molds and the central mold perform an opening and closing movement from and to each other and the central mold is provided with component holders and components for placement on said inside wall of said hollow body, said component holders arranged on said carrier which being extendable from within said central mold to each side of said central mold, said component holders displaceable with respect to said carrier to fix said components on said inside wall of said hollow body when said molds are closed against said central mold and separable from said components thereafter, wherein said outer molds in said closed position form a peripheral flange for said hollow body, and wherein the carrier is guided displaceably from within the central mold in the opening and closing movement direction of the outer mold portions.

2. A mold tool as set forth in claim 1 characterized in that the carrier is lockable at least in the set-out or extended position.

3. A mold tool as set forth in claim 1 characterized in that the carrier is displaceable by means of at least one pneumatic drive.

4. A mold tool as set forth in claim 1 characterized in that the component holders are displaceable with respect to the carrier by way of pneumatic drives fixed on the carrier.

5. A mold tool as set forth in claim 1 characterized in that the component holders are within said central mold when the mold tool is in the open position.

6. A mold tool as set forth in claim 1 characterized in that the component are within said central mold when the mold tool is in the open position.

7. A mold tool as set forth in claim 1 characterized in that the component holders are displaceable with respect to the carrier to weld the components on the inside wall of the hollow body.

\* \* \* \* \*